United States Patent
Pizzo et al.

(10) Patent No.: US 10,257,588 B2
(45) Date of Patent: Apr. 9, 2019

(54) SYSTEMS AND METHODS FOR INSERTING BREAKPOINTS AND REFERENCE LINKS INTO A MEDIA FILE

(71) Applicant: VIACOM INTERNATIONAL INC., New York, NY (US)

(72) Inventors: Vincenza Pizzo, New York, NY (US); Joel Sanders, New York, NY (US)

(73) Assignee: Viacom International Inc., New York, NY (US)

(*) Notice: Subject to any disclaimer, the term of this patent is extended or adjusted under 35 U.S.C. 154(b) by 381 days.

(21) Appl. No.: 14/658,924

(22) Filed: Mar. 16, 2015

(65) Prior Publication Data

US 2016/0277813 A1  Sep. 22, 2016

(51) Int. Cl.
| | |
|---|---|
| H04N 7/10 | (2006.01) |
| H04N 7/025 | (2006.01) |
| H04N 21/858 | (2011.01) |
| H04N 21/845 | (2011.01) |
| H04N 21/8545 | (2011.01) |
| H04N 21/472 | (2011.01) |
| H04N 21/4788 | (2011.01) |
| H04N 21/44 | (2011.01) |
| H04N 21/4786 | (2011.01) |
| G11B 27/034 | (2006.01) |

(52) U.S. Cl.
CPC ....... H04N 21/8586 (2013.01); G11B 27/034 (2013.01); H04N 21/44016 (2013.01); H04N 21/4786 (2013.01); H04N 21/4788 (2013.01); H04N 21/47202 (2013.01); H04N 21/8455 (2013.01); H04N 21/8545 (2013.01)

(58) Field of Classification Search
CPC .......... H04N 21/8586; H04N 21/8545; H04N 21/4786; H04N 21/8455; H04N 21/4788; H04N 21/47202; H04N 21/44016
USPC .................... 725/32, 36, 40, 42, 51, 93, 112
See application file for complete search history.

(56) References Cited

U.S. PATENT DOCUMENTS

| | | | |
|---|---|---|---|
| 5,297,249 A | 3/1994 | Bernstein et al. | |
| 6,912,726 B1 | 6/2005 | Chen et al. | |
| 7,143,353 B2 | 11/2006 | McGee et al. | |
| 8,316,450 B2 | 11/2012 | Robinson et al. | |
| 2002/0083442 A1* | 6/2002 | Eldering | H04N 7/165 725/34 |
| 2008/0178234 A1 | 7/2008 | Eyal et al. | |
| 2008/0227435 A1* | 9/2008 | Six | H04W 4/12 455/414.1 |
| 2009/0204481 A1* | 8/2009 | Navar | G06Q 30/02 725/14 |

(Continued)

*Primary Examiner* — Nnenna N Ekpo
(74) *Attorney, Agent, or Firm* — Fay Kaplun & Marcin, LLP

(57) ABSTRACT

Described herein are systems and methods for inserting breakpoints and reference links into a multimedia file. A method may comprise receiving breakpoint information from a content provider, wherein the breakpoint information is specific to a first digital media file of a plurality of digital media files, inserting a plurality of breakpoints into the first digital media file based on the breakpoint information, wherein the plurality of breakpoints designate at least one clip within the first digital media file, receiving a user share request from a user device to share the at least one clip within the first digital media file, and providing the user device with a sharable reference link to the at least one clip.

20 Claims, 3 Drawing Sheets

(56) References Cited

U.S. PATENT DOCUMENTS

| | | |
|---|---|---|
| 2012/0005702 A1 | 1/2012 | Tindell |
| 2012/0290953 A1 | 11/2012 | Russell et al. |
| 2012/0311624 A1* | 12/2012 | Oskolkov .......... H04N 21/2541 |
| | | 725/25 |
| 2013/0227074 A1 | 8/2013 | Odlund et al. |
| 2013/0260896 A1* | 10/2013 | Miura .................... A63F 13/12 |
| | | 463/42 |
| 2014/0101289 A1* | 4/2014 | Antonov ............. H04L 41/0253 |
| | | 709/218 |
| 2016/0011743 A1* | 1/2016 | Fundament ........... G06F 3/0482 |
| | | 715/716 |

* cited by examiner

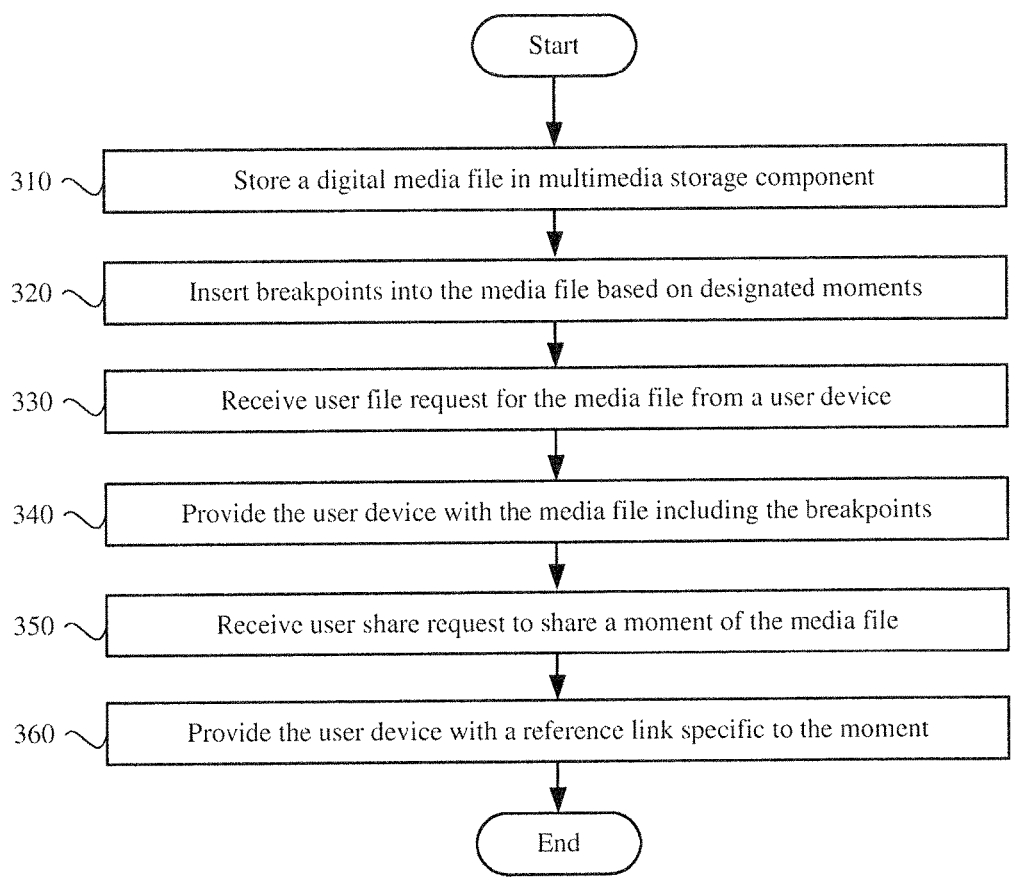

SYSTEMS AND METHODS FOR INSERTING BREAKPOINTS AND REFERENCE LINKS INTO A MEDIA FILE

BACKGROUND

Video on demand ("VOD") services are systems which allow users to select and watch video content when they choose to as opposed to having the users watch at a specific broadcast time. Similarly, audio on demand services may allow users to select and listen to content when they choose. Accordingly, on-demand services such as television VOD systems may stream content through a set-top box, a computer or other device, allowing viewing in real time. In addition, VOD services may allow the user to download the content to a device such as a computer, digital video recorder ("DVR") or portable media player for viewing at any time. The majority of content providers offer streaming VOD, such as pay-per-view and free content, wherein a user buys or selects a movie or television program and it begins to play on the television set immediately. Content providers may also offer the ability to download the content to a DVR or other device (e.g., personal computer ("PC"), tablet, smartphone, etc.) for viewing in the future via a multimedia player application.

The term "application software" refers to any computer software that causes a computer to perform functional tasks beyond the running of the computer itself. Application software applies the power of a particular computing platform or system software to a particular purpose. Specific instance of this software are called software applications, applications or simply "apps." The term app is used in contrast to system software that typically manages and integrates the capabilities of a computing device but does not directly perform tasks that benefit the user. In other words, the system software serves the app, while the app in turn serves the user.

In recent years, the term "mobile app" has been used to primarily refer to applications for mobile computing devices such as smartphones, tablets, etc. Mobile apps are usually available to a consumer through various application distribution platforms, such as "app stores," that are typically operated by the owner of the mobile operating system for the mobile computing device. While mobile apps were originally offered for general productivity and information retrieval (e.g., email, calendar, contacts, etc.), the functionality of mobile apps has expanded into other categories such as stock market and weather information, GPS and location-based services, banking, order-tracking, and entertainment such as mobile games and media presentation. In the field of media presentation, mobile apps are used to provide an end user with streaming multimedia to the mobile computing device. Streaming multimedia refers to media that is constantly received by and presented to an end-user while being delivered by a content provider.

Furthermore, the term "social media" has been used primarily to refer to the techniques for interacting among people by creating, sharing, and exchanging information and ideas in virtual communities and networks. Social media may include a group of Internet-based applications (e.g., mobile apps) that allow this creation and exchange of such user-generated content. Those skilled in the art would understand that social media may rely on mobile and web-based technologies to create increasingly interactive platforms for individuals and communities share, create, discuss, and modify user-generated content. Accordingly, mobile technologies, such as mobile apps, introduce substantial changes and a broader reach in the communication between organizations, communities, and individuals within a social media network.

SUMMARY

Described herein are systems and methods for inserting breakpoints and reference links into a multimedia file. A method may comprise receiving breakpoint information from a content provider, wherein the breakpoint information is specific to a first digital media file of a plurality of digital media files, inserting a plurality of breakpoints into the first digital media file based on the breakpoint information, wherein the plurality of breakpoints designate at least one clip within the first digital media file, receiving a user share request from a user device to share the at least one clip within the first digital media file, and providing the user device with a sharable reference link to the at least one clip.

Further described herein is a non-transitory computer readable storage medium with an executable program stored thereon, wherein the program instructs a processor to perform actions. The actions may include receiving breakpoint information from a content provider, wherein the breakpoint information is specific to a first digital media file of a plurality of digital media files, inserting a plurality of breakpoints into the first digital media file based on the breakpoint information, wherein the plurality of breakpoints designate at least one clip within the first digital media file, receiving a user share request from a user device to share the at least one clip within the first digital media file, and providing the user device with a sharable reference link to the at least one clip.

Further described herein is a media on-demand server comprising a memory storing a plurality of rules and a processor coupled to the memory and configured to perform actions. The actions may include receiving breakpoint information from a content provider, wherein the breakpoint information is specific to a first digital media file of a plurality of digital media files, inserting a plurality of breakpoints into the first digital media file based on the breakpoint information, wherein the plurality of breakpoints designate at least one clip within the first digital media file, receiving a user share request from a user device to share the at least one clip within the first digital media file, and providing the user device with a sharable reference link to the at least one clip.

DESCRIPTION OF THE DRAWINGS

FIG. 3 shows an exemplary method inserting breakpoints and reference links into a media file according to an exemplary embodiment described herein.

DETAILED DESCRIPTION

Figure 1:
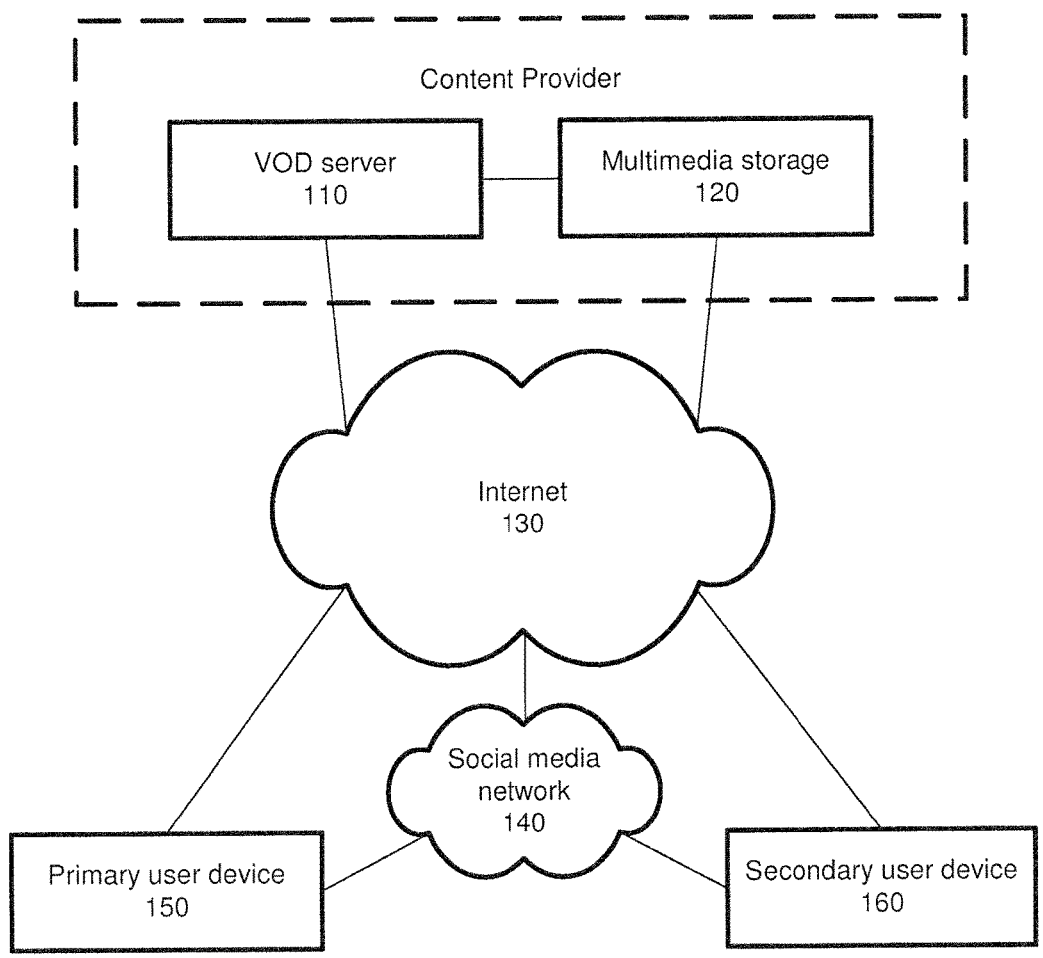
FIG. 1 shows an exemplary system for inserting breakpoints and reference links into a media file according to an exemplary embodiment described herein.

The exemplary embodiments may be further understood with reference to the following description and the appended drawings, wherein like components are referred to with the same reference numerals. The exemplary embodiments show systems and methods for inserting breakpoints and reference links into a media file.

According to the exemplary embodiments described herein, the systems and methods for inserting breakpoints and reference links into a media file may allow for multimedia content, such as VOD, to be delivered to a user (e.g., viewer) with embedded markers. For instance, these markers embedded into the content serve as starting points and ending points of an abbreviated clip, or "moment," within the media file. Furthermore, each of these moments may be associated with a sharable reference link. In other words, the user may select a specific moment or clip within the media file and receive a link, such as a hyperlink, to share with other users via various social media networks.

As opposed to sharing the entire duration of the media file, the viewing user may share a particular moment of the file through the use of the sharable reference link. Therefore, the exemplary embodiments may provide the user with the ability to use existing social connections of the user to share interesting moments within multimedia content. While the exemplary embodiments describe the use of social media networks, one skilled in the art will understand that the content may be shared between user across any type of network or multiple networks and services, such as, but not limited to, electronic mail networks, Facebook™, Twitter™, etc.

It may be noted that while the embodiments discussed above relate to a media file featuring embedded markers to designate certain moments within the media file, additional embodiments may include the use of multiple stand-alone files, such as discrete short form content. In other words, as opposed to sharing markers in a single large media file, such as an entire episode of a program, the users may share these discrete short form clips from the episode.

According to an exemplary embodiment of the systems and methods described herein, the content may be presented to the user via an interactive multimedia player application, wherein the content may include instant video files, on-demand videos, full-length episodic video content, music/audio files, news and media feeds, recorded performances, etc. Furthermore, one exemplary embodiment described herein may relate to a dedicated multimedia application executing on a user device, such as a streaming video player. However one skilled in the art will understand that the abilities to view media content, select designated moments, and share moments with other users may be implemented on any number of applications executing on various computer devices, such as set-top boxes, DVR devices, PCs, tablets, smartphones, etc.

FIG. 1 shows an exemplary system 100 for inserting breakpoints and reference links into a media file according to an exemplary embodiment described herein. The system 100 may include a VOD server 110, such as a streaming music/audio and video content application. One skilled in the art will understand that streaming multimedia technology allow users to watch live or on-demand video without downloading a copy directly to a computing device. For instance, the exemplary VOD server 110 may include interactive features, such as the ability for the user to play, pause, resume, stop, fast-forward, rewind, etc. In addition, the VOD server 110 may be used in connection to a subscription-based VOD service, wherein the service is offered to users through payment systems that charge subscribers a periodic (e.g., monthly) fee for accessing unlimited content.

In addition to the VOD server 110, the exemplary system 100 may include a multimedia storage component 120 in communication with the VOD server 110. It may be noted that while the storage component 120 is depicted in system 100 as a separate component from the VOD server 110, additional embodiments of the systems described herein are not limited to the illustrations of FIG. 1. Accordingly, the storage component 120 may be integrated into the VOD server 110 as a single stand-alone component. Alternative, each of the components may be located remotely from one another and connected via a network, such as the Internet 130. Regardless of the various configurations, the storage component 120 may store and maintain any number of multimedia content files, such as video content. The VOD server 110 may access these content files based on requests received by users.

As illustrated in FIG. 1, the system 100 may include additional networks, or sub-networks, such as a social media network 140, connected to a plurality of user devices, such as a primary user device 150 and a secondary user device 160. For instances, both of the users of the devices 150 and 160 may be members of the same social media network 140. In the alternative to the social media network 140, the users may be connected to one another simply via the internet 130, such as through e-mail correspondence, short message service ("SMS"), enhanced messaging service ("EMS"), multimedia message service ("MMS"), etc.

According to the exemplary embodiments of the system 100, the primary user may request media content from the content provider. For instance, the primary user 150 may visit a webpage of the content provider and view user-selected media through the user's internet browser interface. Alternatively, the primary user may download the multimedia content application for their computing device (e.g., PC, tablet, smartphone, etc.) and initiate streaming media for viewing via the application interface.

As will be described in greater detail below, the primary user 150 may transmit a user request through the internet 130 to the VOD server 110. Specifically, the user request may indicate specific media content. Examples of the media content accessible by the software application may include instant videos, on-demand videos, full-length episodic video content, behind-the-scenes videos, photographs, news and media feeds, games, puzzles, user polls, advertisements, etc. In addition, it may be noted that certain content (e.g., full-length episodes of content) may be available to the user via a subscriber authentication process.

Upon receiving the user request, the VOD server 110 may respond be sending the specific content. For instance, the VOD service 110 may utilize a streaming media protocol to deliver the content to the user device 150. The user device 150 may then utilize a media player to view the content. As discussed above, the media player may be available through an internet browser, a multimedia application (e.g., a mobile app), a plugin, etc.

Figure 2:
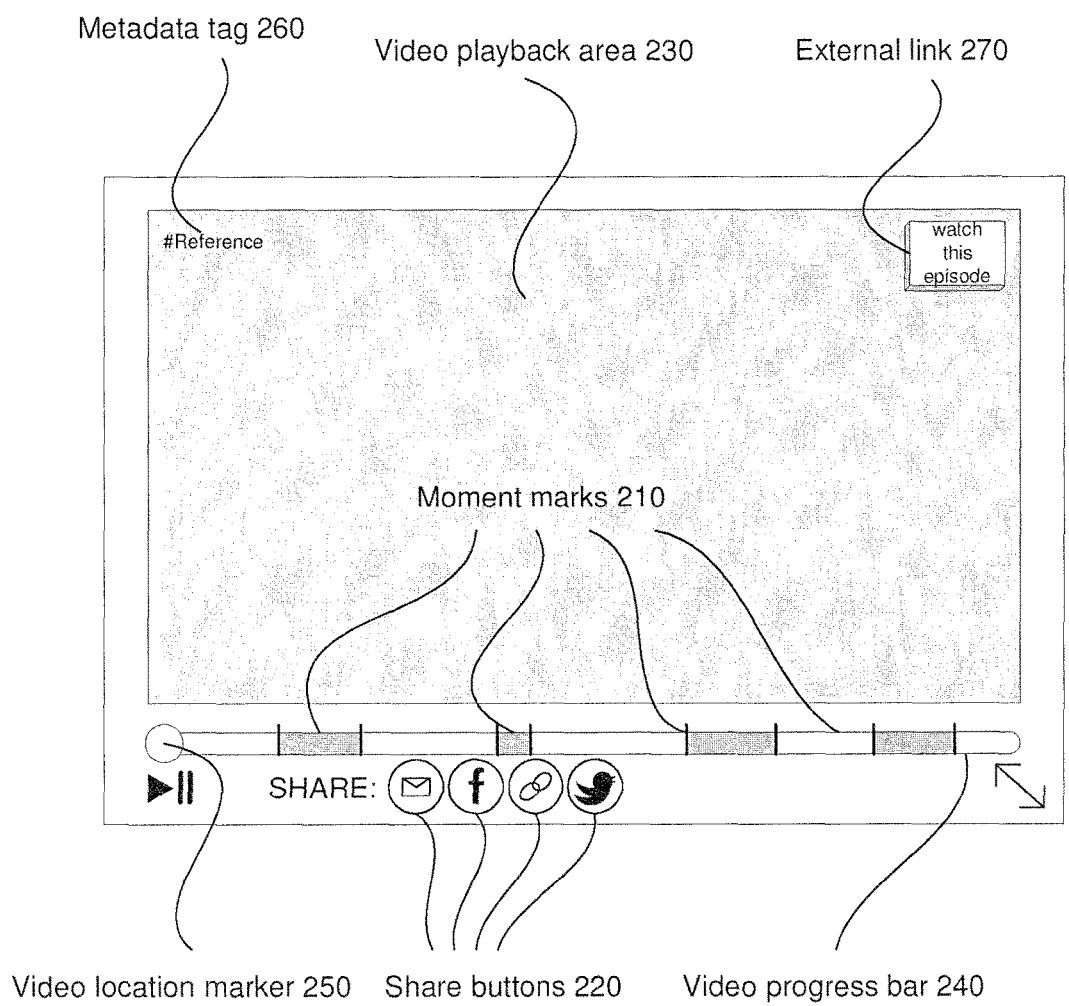
FIG. 2 shows an exemplary graphical user interface ("GUI") on a user device running a multimedia application according to an exemplary embodiment described herein.

FIG. 2 shows an exemplary GUI 200 on the primary user device 150 running the multimedia application according to an exemplary embodiment described herein. The exemplary multimedia application on the user device 150 may present an interactive media player to the user via the GUI 200. The GUI 200 may include a video playback area 230, a progress bar 240, and a location marker 250. In addition, the GUI 200 may feature any number of standard elements, such as play/pause buttons, skip buttons, minimize/maximize display buttons, etc. In other words, by receiving user input (e.g., touch screen interactions, point and click input, etc.), the user may control the operation and display of various media content via the GUI 200 on the user device 150.

The progress bar 240 may include a plurality of breakpoints, or discrete moment markers 210, throughout the duration of the media content. These moment markers 210 may correspond to short clips, or moments, within the media file. For instance, the moments may relate to a brief scene within a full-length episode of a television program. Accordingly, these moment markers 210 may be designated by the content provider and inserted into the playback of the media file. While the GUI 200 depicted in FIG. 2 includes four separate moments 210, it may be noted that the content provider for various media files may designate any number of moments having different lengths.

The GUI 200 may also feature a plurality of share buttons 220 to allow the user to share or distribute a specific moment to another user over a variety of communication networks (e.g., social media networks, e-mail correspondence, text messaging, etc.). For instance, while a user is viewing a specific moment of a television as depicted by the moment markers 210, the user may select one of the share buttons 220 to allow a secondary user to view the same moment within the media file. Specifically, each of the moments within the moment markers 210 may feature an individualize reference link that is specific to the moment, as well as to the selected form for sharing the content.

It may be noted that the shareable moment that is viewed by the secondary user may be in the form of a media file featuring the moment markers 210 embedded into the file at designated locations. These embedded moment markers 210 may serve as indicators for starting and stopping the moment selected by the primary user. Alternatively, the shareable moment may be contained in a stand-alone clip, such as an abbreviated media file (e.g., shorter than a full-length episode media file). In other words, an episode of a program may include a plurality of several discrete short-form media files or video clips. Each of these short-form clips may serve as the shareable moment between the primary user and the secondary user.

According to one exemplary embodiment, the user may select to share a moment of an episode with a friend via e-mail correspondence. Using this example, the user may select the "mail" button of the share buttons 220 while the location marker 250 is within a certain moment and the playback area 230 displays that moment. Upon selecting the "mail" button, the user may be provided with a reference link, such as a hyperlink, that is specific to the designated moment. Furthermore, the selection of the "mail" button may automatically open an e-mail application with the hyperlink in the body of a new message and a pre-written subject line in the header. The user may then select one or more recipients of the message and share the reference link to the specific moment with any number of other users. While the example described above relates to sharing moments via e-mail correspondence, one skilled in the art will understand that similar methods may be utilized for sharing reference links to moments via text messaging, social media outlets, etc. Accordingly, the interactive share buttons 220 of the GUI 200 may lead the user off the multimedia application to other user interfaces, such as a new e-mail/text message interface, a social media website or third party application.

The exemplary GUI 200 may also include a metadata tag 260 (e.g., #Reference) that is specific to the clip being viewed on the video playback area 230. Accordingly, this metadata tag 260 may be included in the sharable reference link provided to the user device 150. The GUI 200 may further include an external link 270, such as a "Watch this episode" button, that links the viewing user device 150 to additional content. Therefore, the user may easily access further related content from a viewed clip of an episode. For instance, if the secondary user device 160 receives a reference link to this short clip from the primary user device 150, the secondary user may be interested in more clips or the entire episode of content. By selecting the external link 270 from the GUI 200, the secondary user device 160 may then be linked to the multimedia application and/or additional multimedia files available from the content provider.

The exemplary GUI 200 may also feature any number of additional links, such as a home page link for promoting specific content to the user. In addition, the multimedia application may allow for the user to select specific content or content theme to follow as a user favorite. For instance, the user may select one or more individual pieces of content as a user favorite. In addition, the user may select all content related to a specific theme (e.g., property, actor, character, etc.) as being user favorite content. The user favorite option may allow for the user to easily track or follow all of the content that is most interesting to that user.

FIG. 3 shows an exemplary method 300 for inserting breakpoints and reference links into a media file according to an exemplary embodiment described herein. The steps performed by the method 300 will be described in reference to the exemplary system 100 and GUI 200 and their respective elements as described above with reference to FIGS. 1 and 2. For instance, the VOD server 110 may a processor and a memory storing a set of instructions executable by the processor.

As described above, the interactive GUI 200 may be displayed on the primary user device 150 to interface with the multimedia application provided by the VOD server 110. The GUI 200 may include buttons, such as soft keys, for receiving user requests such as user file requests and user share requests. Furthermore, the GUI 200 may feature buttons for allowing the user to control the playback of the media file within the multimedia application. The media available to the user device 150 via the VOD server 110 may include information content, entertainment content, educational content, advertising and promotional content, commerce content, etc. Examples of the content may include music/audio files, video files, full-length programming episodes, social media and/or news feeds, learning aids and tools, advertisements, etc. According to one embodiment, the media file may be in the form a single full-length episode featuring designated breakpoints or moments markers 210. According to a further embodiment, the media file may contain multiple short-form files (e.g., video clips of the full-length episode).

One skilled in the art will understand that the exemplary method 300 describes one of any number of methods for distributing multimedia content to the user device 150. While method 300 describes the use of a multimedia application, such as a mobile app, in communication with the VOD server 110, alternative methods may be implemented by the exemplary systems and methods. For instance, a stand-alone multimedia application is not required, as the user may also provide the VOD server 110 with user requests via an internet browser. Thus, the delivery of the multimedia content to the user device 150 is not limited to the method 300 described in FIG. 3.

In step 310, the first digital media file may be stored in the multimedia storage component 120. As noted above, the storage component 120 may be a stand-alone component that is remotely connected to the VOD server 110 via a network (e.g., an intranet, the internet, etc.). Alternatively, the storage component 120 may be integrated within the VOD server 110. In addition to storing media files, the multimedia storage component 120 may also maintain, catalog, categorize and organize the files according to any number of characteristics, such as, but not limited to, media types, specific programs and artists, etc. Furthermore, as noted above, the first digital media file may include a plurality of short-form media files, such as video clips designated as shareable moments.

In step 320, a plurality of breakpoints may be inserted into a first digital media file stored on the storage component 120 based on the breakpoint information. These breakpoints may be designated by the content provider to segregate at least one clip, or moment, within the first digital media file. Specifically, the VOD server 110 may receive breakpoint information from the content provider, wherein the breakpoint information may be specific to the first digital media file of a plurality of digital media files. Furthermore, within the embodiments wherein the first digital media file contains multiple short-form files, the starting points and ending points of these files may serve as the breakpoints.

In step 330, a user file request may be received for the first digital media file. Specifically, the user may interact with the VOD server 110 through the user device 150. For instance, the interactions of the user may be performed through the multimedia application or a web browser interface. The VOD server 110 may provide the user device 150 with a display of all available multimedia content files, such as a listing of serial television programs including season and episode information.

In step 340, the user device 150 may be provided with the requested media file including the inserted breakpoints. Specifically, the VOD server 110 may retrieve the first digital media file from the media storage component and transmit the first digital media file to the user device. According to one exemplary embodiment, the user may select a specific episode of a specific season of television program available from the VOD server 110 of the content provider. Upon receiving the episode, the user device 150 may be provided with the interactive GUI 200 to allow the user to control the playback of the media file.

In step 350, a user share request may be received from a user device to share the moment or clip within the selected digital media file. Specifically, the user may select one of the share buttons 220 on the GUI 200 to initiate a sharing process for distributing the moment to a secondary user on the secondary user device 160. Any number of communication options may be available to the user via the share buttons 220. The communication options may include e-mail and text correspondence, social media interactions such as broadcast messages and direct messages, blog and message board postings, etc.

In step 360, the user device may be provided with a sharable reference link to the at least one clip, thereby allowing the user of the primary user device 150 to share the requested moment with another user of the secondary user device 160. Specifically, the reference link may be formatted to instruct the secondary device 160 on how to access the clip of the media file. For instance, examples of a sharable reference link may include a uniform resource locator ("URL"), a hyperlink and a direct link to a software application. According to one exemplary embodiment, the sharable reference link may instruct the secondary user device 160 to open a media player, such as the multimedia application of the content provider or a third-party media player. The reference link may correspond to the specific program episode (e.g., media file) and moment (e.g., abbreviated clip) of the episode.

According to the exemplary systems and methods described herein, the VOD server 110 may serve as an interactive tool for delivering episodic and branded content to the user on a recurring basis. The VOD server 110 may allow for new material to be introduced to a user base and shared with new users in a fun and interactive manner. For instance, the sharable content may include memorable moments within existing programming. For instance, the sharable content or moment from a program may include a very funny scene, highly controversial scene, a viral video, or otherwise popular clip from a media file of the content provider. The sharable content may also serve as an innovative way to reach users through different mediums, thereby providing the user with a more in-depth viewing experience. Furthermore, the ability to share moments between users may be tracked and analyzed by the content provider in order to gauge the usage and popularity of the available content, the multimedia application, performers and artists, and the content provider itself.

Those of skill in the art will understand that the above-described exemplary embodiments may be implemented in any number of matters, including as a software application, as a software program, etc. For example, the exemplary method 300 may be embodied in a program stored in a non-transitory storage medium and containing lines of code that, when compiled, may be executed by a processor (e.g., a processor of the VOD server 110). Furthermore, one skilled in the art will understand that the exemplary software application may be coded in any computer readable language, such as, for example, a markup language (e.g., HTML5, etc.).

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
receiving breakpoint information from a content provider, wherein the breakpoint information is specific to a first digital media file of a plurality of digital media files;
inserting a plurality of breakpoints into the first digital media file based on the breakpoint information, wherein the plurality of breakpoints designate a plurality of clips within the first digital media file;
receiving a user share request from a user device to share a first one of the clips within the first digital media file, the first clip selected by a user being identified based on a playback time indicated by the user share request as a portion of the first digital media file extending from a first breakpoint immediately prior to the playback time indicated in the user share request to a second breakpoint immediately following the playback time indicated in the user share request, the first clip being associated with a shareable reference link; and
providing the user device with the shareable reference link to the first clip.

2. The method of claim 1, further comprising:
storing the first digital media file in a media storage component;
receiving a user file request for the first digital media file;
retrieving the first digital media file from the media storage component; and
transmitting the first digital media file to the user device.

3. The method of claim 1, wherein the first digital media file is provided to the user device through an interactive multimedia player application.

4. The method of claim 1, wherein the breakpoint information defines a second one of the clips within the first digital media file, the second clip being defined by a third breakpoint and a fourth breakpoint.

5. The method of claim 1, wherein the sharable reference link is one of a uniform resource locator ("URL"), a hyperlink, and a link to a software application.

6. The method of claim 1, wherein the sharable reference link is formatted in accordance with one of an e-mail message, a text message, and a social media network communication.

7. The method of claim 1, wherein the first digital media file is an on-demand video episode.

8. A non-transitory computer readable storage medium with an executable program stored thereon, wherein the program instructs a processor to perform actions that include:
- receiving breakpoint information from a content provider, wherein the breakpoint information is specific to a first digital media file of a plurality of digital media files;
- inserting a plurality of breakpoints into the first digital media file based on the breakpoint information, wherein the plurality of breakpoints designate a plurality of clips within the first digital media file;
- receiving a user share request from a user device to share a first one of the clips within the first digital media file, the first clip selected by a user being identified based on a playback time indicated by the user share request as a portion of the first digital media file extending from a first breakpoint immediately prior to the playback time indicated in the user share request to a second breakpoint immediately following the playback time indicated in the user share request, the first clip being associated with a shareable reference link; and
- providing the user device with the shareable reference link to the first clip.

9. The non-transitory computer readable storage medium of claim 8, wherein the actions further include:
- storing the first digital media file in a media storage component;
- receiving a user file request for the first digital media file;
- retrieving the first digital media file from the media storage component; and
- transmitting the first digital media file to the user device.

10. The non-transitory computer readable storage medium of claim 8, wherein the first digital media file is provided to the user device through an interactive multimedia player application.

11. The non-transitory computer readable storage medium of claim 8, wherein the breakpoint information defines a second clip within the first digital media file, the second clip being defined by a third breakpoint and a fourth breakpoint.

12. The non-transitory computer readable storage medium of claim 8, wherein the sharable reference link is one of a uniform resource locator ("URL"), a hyperlink, and a link to a software application.

13. The non-transitory computer readable storage medium of claim 8, wherein the sharable reference link is formatted in accordance with one of an e-mail message, a text message, and a social media network communication.

14. The non-transitory computer readable storage medium of claim 8, wherein the first digital media file is an on-demand video episode.

15. A media on-demand server, comprising:
- a memory storing a plurality of rules; and
- a processor coupled to the memory and configured to perform actions that include:
  - receiving breakpoint information from a content provider, wherein the breakpoint information is specific to a first digital media file of a plurality of digital media files;
  - inserting a plurality of breakpoints into the first digital media file based on the breakpoint information, wherein the plurality of breakpoints designate a plurality of clips within the first digital media file;
  - receiving a user share request from a user device to share a first one of the clips within the first digital media file, the first clip selected by a user being identified based on a playback time indicated by the user share request as a portion of the first digital media file extending from a first breakpoint immediately prior to the playback time indicated in the user share request to a second breakpoint immediately following the playback time indicated in the user share request, the first clip being associated with a shareable reference link; and
  - providing the user device with the shareable reference link to the first clip.

16. The media on-demand server of claim 15, wherein the processor is further configured to perform:
- storing the first digital media file in a media storage component;
- receiving a user file request for the first digital media file;
- retrieving the first digital media file from the media storage component; and
- transmitting the first digital media file to the user device.

17. The media on-demand server of claim 15, wherein the first digital media file is provided to the user device through an interactive multimedia player application.

18. The media on-demand server of claim 15, wherein the breakpoint information defines a second clip within the first digital media file, the second clip being defined by a third breakpoint and a fourth breakpoint.

19. The media on-demand server of claim 15, wherein the sharable reference link is one of a uniform resource locator ("URL"), a hyperlink, and a link to a software application.

20. The media on-demand server of claim 15, wherein the sharable reference link is formatted in accordance with one of an e-mail message, a text message, and a social media network communication.

* * * * *